(12) United States Patent
Balin et al.

(10) Patent No.: US 12,455,974 B2
(45) Date of Patent: Oct. 28, 2025

(54) COMPUTING SYSTEMS AND METHODS PROVIDING COMMAND CONTENT VALIDATION

(71) Applicant: Dell Products, L.P., Round Rock, TX (US)

(72) Inventors: Maxim Balin, Gan-Yavne (IL); Roman Bober, Ashdod (IL); Doron Bokobza, Beer Sheva (IL)

(73) Assignee: Dell Products, L.P., Round Rock, TX (US)

( * ) Notice: Subject to any disclaimer, the term of this patent is extended or adjusted under 35 U.S.C. 154(b) by 71 days.

(21) Appl. No.: 18/458,837

(22) Filed: Aug. 30, 2023

(65) Prior Publication Data

US 2025/0077690 A1 Mar. 6, 2025

(51) Int. Cl.
*G06F 21/60* (2013.01)
*G06F 9/54* (2006.01)
*G06F 40/211* (2020.01)
*G06F 40/30* (2020.01)

(52) U.S. Cl.
CPC .............. *G06F 21/606* (2013.01); *G06F 9/54* (2013.01); *G06F 40/211* (2020.01); *G06F 40/30* (2020.01)

(58) Field of Classification Search
CPC ........ G06F 21/606; G06F 9/54; G06F 40/211; G06F 40/30
See application file for complete search history.

(56) References Cited

U.S. PATENT DOCUMENTS

| | | | |
|---|---|---|---|
| 9,563,420 B2* | 2/2017 | Osminer | G06F 9/44589 |
| 11,604,684 B1* | 3/2023 | Hinrichs | G06F 9/45558 |
| 2017/0177878 A1* | 6/2017 | Adam | H04L 41/22 |
| 2023/0111194 A1 | 4/2023 | Shachar et al. | |
| 2023/0214248 A1* | 7/2023 | Sancheti | G06F 16/951 718/1 |
| 2024/0403413 A1* | 12/2024 | Cohen | H04L 63/1425 |

* cited by examiner

*Primary Examiner* — Sm A Rahman
(74) *Attorney, Agent, or Firm* — Fogarty LLP (57) ABSTRACT

Systems and methods support command content validation. During runtime of an application, a command content validator may intercept a first command directed to a first software component, wherein the application includes a plurality of software components; compare the first command to a stored set of policies, wherein the set of policies sets out either or both of allowed command content and disallowed command content; determine that the first command is allowed based on the set of policies; and allow or disallow a first requested action of the first command to be performed.

20 Claims, 5 Drawing Sheets

COMPUTING SYSTEMS AND METHODS PROVIDING COMMAND CONTENT VALIDATION

FIELD

The present disclosure relates to computing security and more particularly to tools for validating command content in a computing system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Further, as the value and use of information continues to increase, so does the value of security. There is a need in the art for effective and efficient techniques for providing computing security.

SUMMARY

In various embodiments, a method includes: during runtime of an application, intercepting a first command directed to a first software component, wherein the application includes a plurality of software components; comparing the first command to a stored set of policies, wherein the set of policies sets out either or both of allowed command content and disallowed command content; determining that the first command is allowed based on the set of policies; and allowing a first requested action of the first command to be performed.

In some embodiments, an IHS (Information Handling System) is configured to support command content validation in an application object layer, and the IHS includes: one or more processors; one or more memory devices coupled to the one or more processors, the one or more memory devices storing computer-readable instructions that, upon execution by the one or more processors, cause the IHS to: receive a first command directed to a first software component of an application, wherein the application includes a plurality of software components; compare the first command to a stored set of policies, wherein the set of policies sets out either or both of allowed command content and disallowed command content; and either allow or disallow a first requested action of the first command based on the set of policies.

In some embodiments, a computer-readable storage device has instructions stored thereon for validating commands within an application operating on an IHS (Information Handling System), wherein execution of the instructions by one or more processors of the IHS causes the one or more processors to: receive a first command directed to a first software component, wherein the application includes a plurality of software components; compare the first command to a stored set of policies, wherein the set of policies sets out either or both of allowed command content and disallowed command content; determine that the first command is disallowed based on the set of policies; and disallow a first requested action of the first command to be performed.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

In the following description, numerous specific details are set forth in order to provide a thorough understanding of embodiments of the present disclosure. It will be apparent to one skilled in the art that embodiments of the present disclosure may be practiced without some of these specific details. Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). While embodiments of the present disclosure have been illustrated and described, the disclosure is not limited to these embodiments only. Numerous modifications, changes, variations, substitutions, and equivalents will be apparent to those skilled in the art, without departing from the scope of the disclosure, as described in the claims.

In the rapidly evolving field of edge computing, software development for edge systems faces numerous challenges that can negatively impact the reliability and security of the final product. These challenges include the desire for secure and efficient object management, a desire for a robust root of trust, and reliable component verification and traceability.

The present disclosure addresses these challenges through a process for command content validation for computing systems generally and as well as in edge systems in particular.

Various implementations include command content validation on the application object layer. Such implementations may allow for verification of the correctness and security of commands or requests made by an application internally between the software components. In some examples, validation may include checking the parameters, syntax, and semantics of the commands against a set of predefined rules or a schema, to ensure that they are well-formed, authorized, and do not pose a security threat. One purpose of command content validation is to prevent malicious or incorrect commands from being executed and to ensure that the application operates as expected.

One example may include hardcoding predefined commands and syntax that are allowed and employed for the correct functioning of the software. Hardcoding predefined commands may be performed per application component and thereby minimize malicious activities even if a vulnerability is discovered.

Continuing with the example, during code building, a developer may identify application programming interface (API) calls that are used in a software application. Furthermore, the developer may automate identification as part of continuous development. The developer may also construct a manifest with a mapping between components and the APIs that are used. The developer may also add interceptor code, such as a side container, for each component to validate API calls during runtime. For instance, on each API call, the interceptor may validate the call by letting the call proceed or may prevent the call if the call is forbidden.

Examples of validating include checking an intercepted call against the manifest, such as a database that is associated with one or more interceptors. The database may include policies regarding syntax and particular semantics of calls that are allowed or forbidden. Based upon a review of the intercepted call against the policies, the interceptor may determine to allow the call or to prohibit the call.

Figure 1:
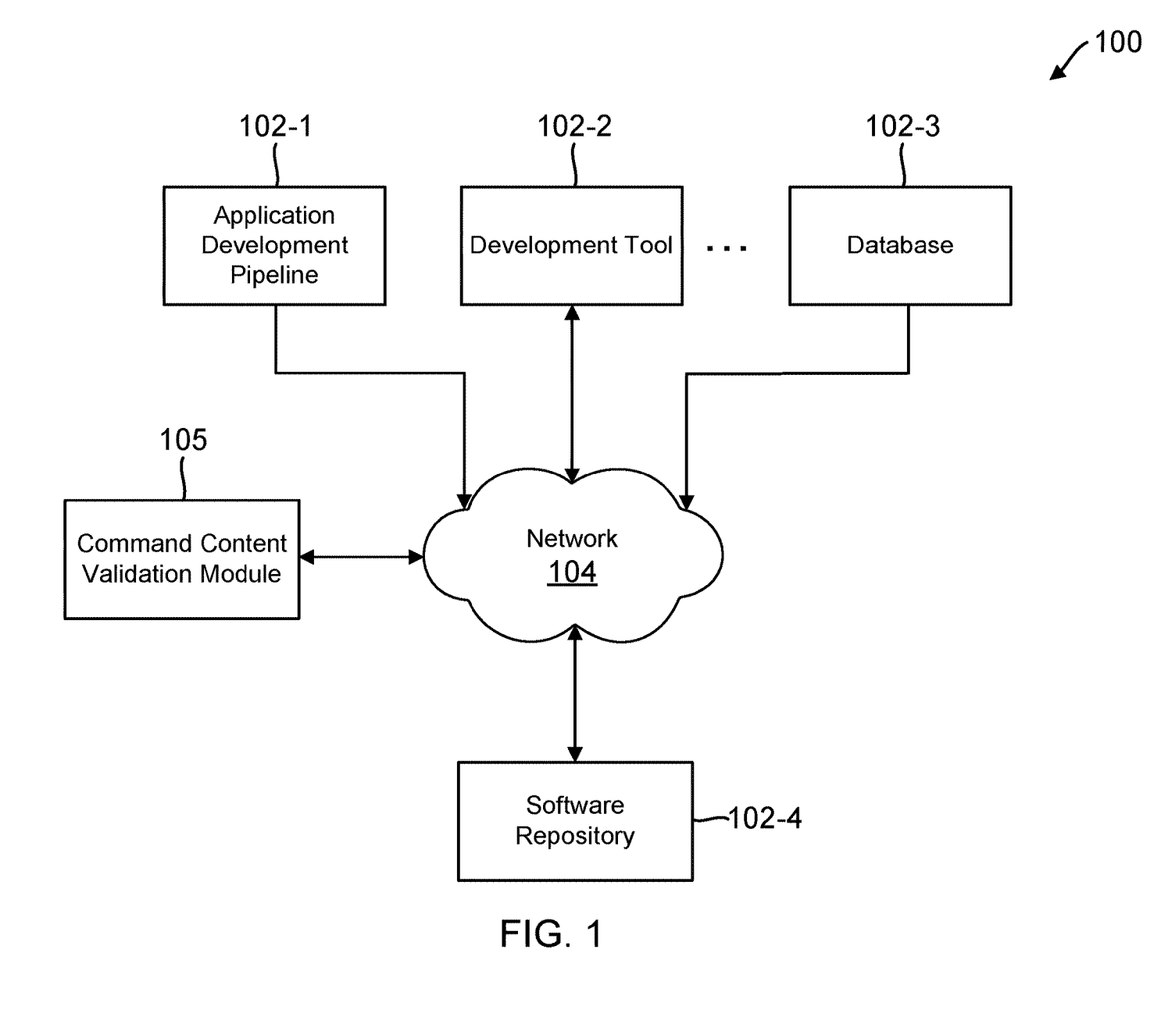
FIG. 1 is an illustration of an example information processing system, according to one embodiment.

FIG. 1 shows a computer network (also referred to herein as an information processing system) 100 configured in accordance with an example embodiment. The computer network 100 includes an application development pipeline 102-1, a development tool 102-2, a database 102-3 and a software repository 102-4. The application development pipeline 102-1, development tool 102-2, database 102-3 and a software repository 102-4 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a command content validation module 105 that may reside on a storage system. Such storage systems may include any of a variety of different types of storage, such as network-attached storage (NAS), storage area networks (SANs), direct-attached storage (DAS) and distributed DAS, as well as combinations of these and other storage types, including software-defined storage.

Each of the application development pipeline 102-1, development tool 102-2, database 102-3, and a software repository 102-4 may include, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The application development pipeline 102-1, development tool 102-2, database 102-3, and a software repository 102-4 in some embodiments include respective computers associated with a particular company, organization or other enterprise. In addition, at least portions of the computer network 100 may also be referred to herein as collectively including an "enterprise network." Numerous other operating scenarios involving a wide variety of different types and arrangements of processing devices and networks are possible.

The network 104 may include a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or 5G network, or various portions or combinations of these and other types of networks. The computer network 100 in some embodiments therefore may include combinations of multiple different types of networks, each including processing devices configured to communicate using internet protocol (IP) or other related communication protocols.

Also associated with the command content validation module 105 are one or more input-output devices, which may include keyboards, displays or other types of input-output devices in any combination. Such input-output devices can be used, for example, to support one or more user interfaces to the command content validation module 105, as well as to support communication between the command content validation module 105 and other related systems and devices not explicitly shown. One or more input-output devices may also be associated with any of the application development pipeline 102-1, development tool 102-2, database 102-3 and a software repository 102-4.

Additionally, the command content validation module 105 in the FIG. 1 embodiment may be implemented using at least one processing device. Each such processing device may include at least one processor and an associated memory and may implement one or more functional modules for controlling certain features of the command content validation module 105.

More particularly, the command content validation module 105 in this embodiment may include a processor coupled to a memory and a network interface. The processor may include any appropriate processing circuit, such as a microprocessor, a microcontroller, an application-specific integrated circuit (ASIC), a field-programmable gate array (FPGA) or other type of processing circuitry, as well as portions or combinations of such circuitry elements.

The memory may include random access memory (RAM), read-only memory (ROM) or other types of memory, in any combination. The memory and other memories disclosed herein may be viewed as examples of what are more generally referred to as "computer-readable storage media" storing executable computer program code or other types of software programs.

One or more embodiments may include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited to spinning magnetic media.

The network interface allows the command content validation module 105 to communicate over the network 104 with the application development pipeline 102-1, development tool 102-2, database 102-3, and a software repository 102-4 and may include one or more transceivers.

A command content validation module 105 may be implemented at least in part in the form of software that is stored in memory and executed by a processor and may reside in any processing device. The command content validation module 105 may be a standalone plugin that may be included within a processing device, may be its own application, or may be implemented in any other appropriate manner.

The command content validation module 105 may be configured to implement command content validation within the software development process. For instance, the command content validation module 105 may allow a human user or software function to identify commands that are used by any of a variety of software components that are in the development process or have been developed and placed in the software repository 102-4. In one example, at least one software component is developed using the open source container orchestration system known as KUBERNETES, available from Cloud Native Computing Foundation. The open source container orchestration system may come with a set of APIs that is extensive and has many paths and endpoints. However, for the particular use for which the software component is adapted, the software component may employ only a fraction of the available APIs so that many of the available APIs are simply unneeded.

Of course, KUBERNETES is just one example. ES 2.0 from OpenGL is another example of a package that includes a set of APIs. It provides an external component that is part of the product, and that component includes the set of APIs that provides extensive functionality, exposing many endpoints and potentially causing security issues.

Thus, in some implementations, the command content validation module 105 may be configured to allow a human user or software function to identify a first set of the APIs which are used and a second set of the APIs which are unused. The command content validation module 105 may use the identification of the used and unused APIs to form policies, such as are described in more detail with respect to FIG. 2. The command content validation module 105 may also be configured to allow for the input of rules regarding syntax of commands and to use those syntax rules to form the policies.

In one implementation of the command content validation module 105, a human user assisted by a software function may parse code of an in-development software component. The human user and software function may identify a first subset of APIs that are used by the software component and may either explicitly, or by omission, identify the second subset of APIs that are unused by the software components. This process may be performed component-by-component and may be repeated per-component as many times as is appropriate, such as each time the particular piece of code is edited. The command content validation module 105 may then produce a plurality of policies allowing the first subset of APIs and disallowing the second subset of APIs and, perhaps, specifying syntax that must be used with the first set of APIs.

Furthermore, the command content validation module 105 may provide for component policies regarding command content, such as which APIs may be used and which syntax may be used.

Figure 2:
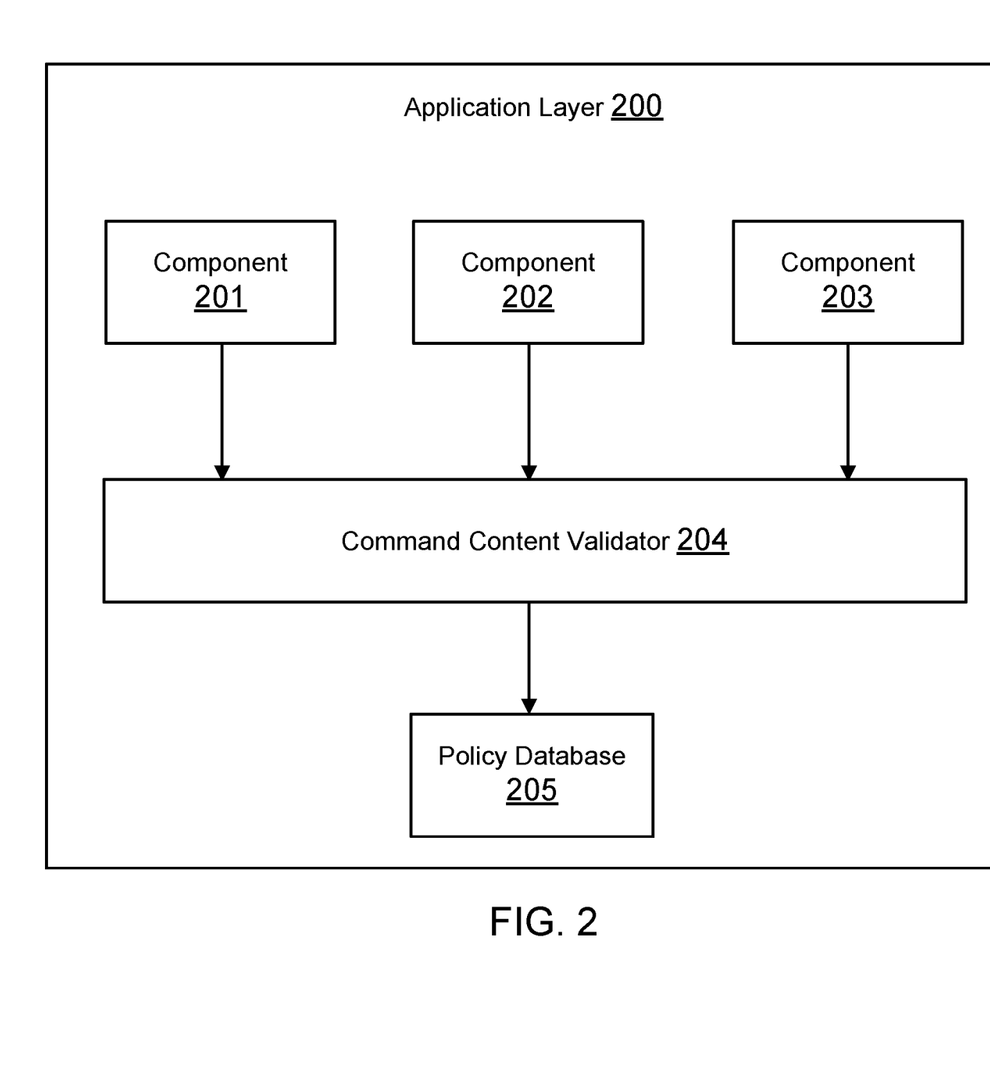
FIG. 2 is an illustration of an example application layer, including multiple software components, according to one embodiment.

FIG. 2 is an illustration of an example application layer 200, according to one embodiment. The example application layer 200 conceptually illustrates an application that has multiple software components 201, 202, 203. The scope of implementations is not limited to any particular type of software component, and examples of software components that may be adapted for use in some embodiments include objects, models, packages, micro-services, containers, and the like.

The interaction between software components 201, 202, 203 within the application 200 layer drives the functionality and behavior of the system. These interactions are facilitated through a set of rules, protocols, and structures that collectively form the architecture of the application in the application layer 200. One aspect of this interaction is the utilization of Application Programming Interfaces (APIs), which serve as the bridges connecting various software components, enabling the software components 201, 202, 203 to collaborate and communicate. A set of APIs may outline the methods, functions, and data structures that software components 201, 202, 203 use to interact with each other.

API calls are how software components 201, 202, 203 request services or exchange data with each other. These calls involve invoking specific functions or methods exposed by the API. For example, in a weather application, an API call might request current weather data for a particular location. These calls adhere to a defined protocol, ensuring that the data exchanged is accurate and consistent. A given API call may originate from one of the software components 201, 202, 203 to a different one of the software components or may originate from external to the application itself. Once received by a particular software component, the call may cause the software component to perform an action.

APIs may be associated with endpoints, which represent specific uniform resource locators (URLs) or paths that correspond to distinct functionalities or resources within an application. Each endpoint corresponds to a set of API calls that can be made to perform various operations. For instance, in a social media application, different endpoints may handle user authentication, posting new content, retrieving user profiles, and more. In an edge computing monitoring application, the different endpoints may handle authentication, remote access control, system reset, performance reporting, and other sensitive items. In other words, APIs that access such endpoints may themselves benefit from scrutiny and validation.

Component-based software development is a paradigm that emphasizes building applications by composing smaller, reusable, and self-contained software components, such as software components 201, 202, 203. The software components 201, 202, 203 may encapsulate specific functionalities and may communicate with each other through well-defined interfaces, typically facilitated by APIs. This approach promotes modularity, scalability, and easier maintenance, as developers may focus on refining individual components without disrupting the entire system.

During runtime, the software components 201, 202, 203 are instantiated. In one example, a call is directed to component 201. However, the call is intercepted by command content validator 204. Put another way, in the present example, the application layer 200 is configured so that commands (e.g., API calls) are not received by software components 201, 202, 203 themselves, but rather are intercepted and validated first. Upon receipt of the call, the command content validator 204 compares the call to one or more policies in the policy database 205.

The policy database 205 may set out a plurality of rules in the positive (i.e., identifying what is allowed), in the negative (i.e., identifying what is not allowed), or a combination thereof. In this example, the command content validator 204 compares the call to the contents in the policy database 205 to determine whether the call is allowed. For instance, a particular policy may identify specific ones of APIs out of a larger set of APIs that are allowed or disallowed. For instance, the API may have a semantic structure, and the command content validator 204 may compare the semantics of the API to allowed or disallowed semantic structure in the database 205.

In another example, the policy database 205 may set out syntaxes that are allowed or disallowed. An example syntax rule may specify that a particular endpoint (e.g., a URL) must conform to a particular text string and may not be modified. In this example, the command content validator 204 compares the syntax of the call to content in the database 205 identifying allowed or disallowed endpoint text strings (or other syntax). Of course, that is one example of syntax, and the scope of implementations may be adapted to apply to any appropriate syntax characteristic.

In yet another example, the policy database 205 may set out allowed or disallowed parameters. For instance, a parameter associated with an API may set out a format of data or an amount of items to be returned. Of course, those are examples of parameters, and the scope of implementations may adapted to apply to any appropriate parameter. Furthermore, while policy database 205 is described as a database, the scope of implementations is not limited to any particular data structure, such as a collection of tables or the like. Rather, the scope of implementations may include any appropriate structure to hold the data that describes allowed and/or disallowed command content characteristics.

Command content validator 204 may be implemented in any appropriate manner. In one example embodiment, command content validator 204 is itself another software component, similar to component 201, 202, or 203, and is instantiated and runs during runtime. The command content validator 204 may be a class, such as a filter class. In another example, the command content validator 204 may not be a single component but may be separate components individually associated with each one of the components 201-203. An example is a Java decorator, which may be implemented above each of the components 201-203. Looking at an example in which component 201 has a decorator, a given command goes to the decorator for validation. If the decorator successfully validates the command, then the decorator may allow the command to pass through to the component 201. On the other hand, should the decorator determine that the command is invalid or otherwise disallowed, then the decorator may drop the command and perhaps implement an exception mechanism.

In yet another example, the components 201-203 are micro services in a system of containers, such as are available under the names KUBERNETES and DOCKER. The command content validator 204 may not be a single component but may be implemented as a side container for each one of the individual components 201, 202, 203. Looking at an example in which component 201 has a side container, a given command goes to the side container, which either successfully validates the command or determines that the command is invalid or disallowed.

Additionally, the policy database 205 may be hardcoded. For instance, the command content validator 204 and the policy database 205 may be coded during development and stored in the software repository 102-4. When the software is shipped to a customer, the code is set and implements the command content validator and the policies in the policy database 205. Of course, during the application development pipeline 102-1, the team of developers may update software components from time to time and may then also update the command content validator 204 and the policy database 205 as appropriate. The updated command content validator 204 and policy database 205 may be updated as part of regular updates or patches.

Figure 3:
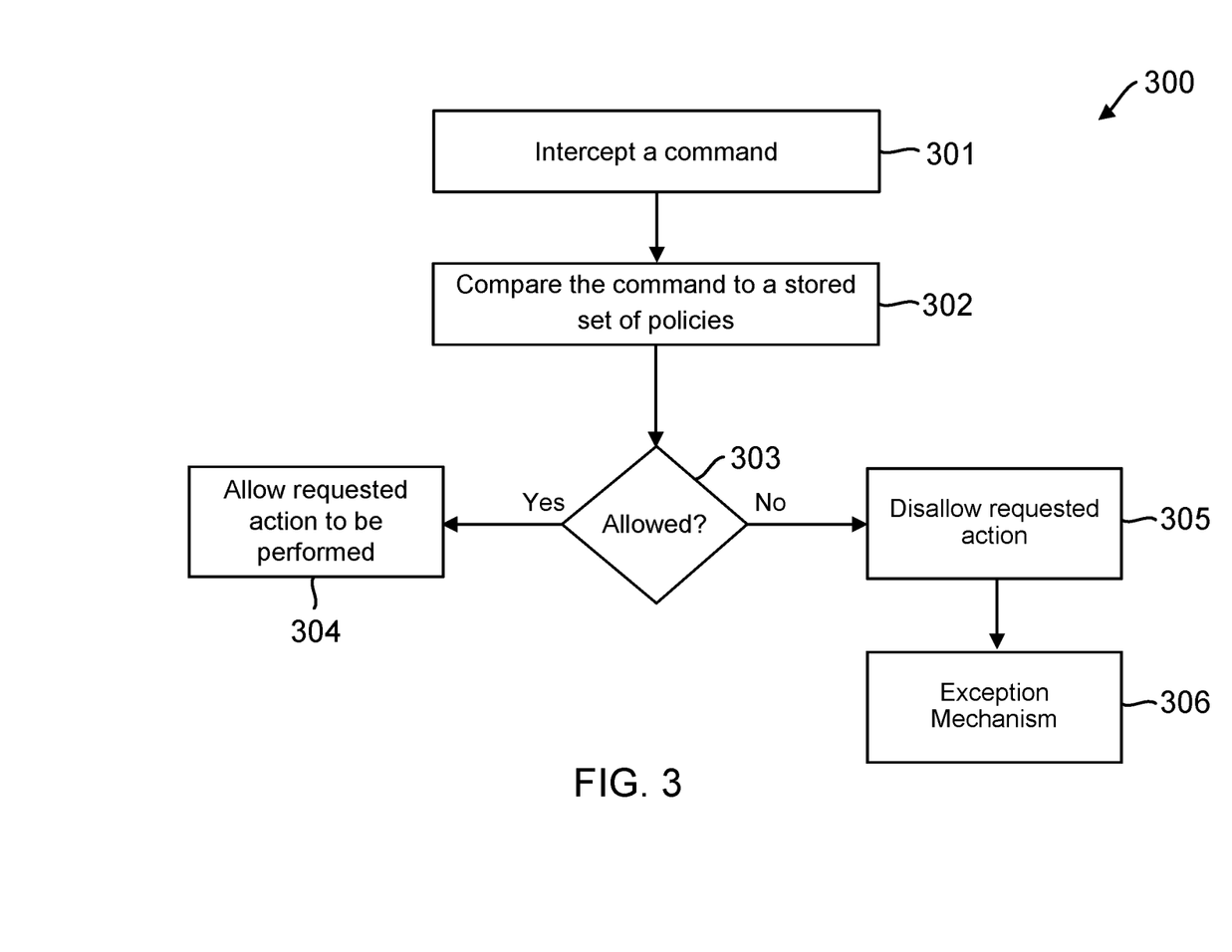
FIG. 3 is a flowchart describing certain steps of a method, according to embodiments, for command content validation.

FIG. 3 is an illustration of an example method 300 for validating command content, according to one embodiment. The actions of method 300 may be performed by a computing device as it executes computer-readable instructions to provide the functionality of a software component or application. For example, a computing device executing computer-readable instructions to provide the functionality of command content validator 204 may perform the actions of method 300.

At action 301, the command content validator intercepts a command. For instance, the command may be an API call or other command, and it may be received from another software component within the application layer or from external to the application. Action 301 may include the command content validator being configured to receive commands before such commands are either passed to a software component or dropped.

At action 302, the command content validator compares the command to a stored set of policies. An example is described above with respect to FIG. 2 in which command content validator 204 may compare semantics, syntax, parameters, or any other appropriate characteristic to policies in policy database 205. Further in this example, the policies in the stored set of policies may be hardcoded though available for updates as appropriate.

At action 303, the command content validator determines that the command is either allowed or disallowed based on the set of policies. For example, the comparing action 302 may include the command content validator determining that a command characteristic either matches or does not match a particular characteristic indicated as allowed or disallowed in the stored set of policies.

At action 304, the command content validator may allow the requested action to be performed in response to determining that the command is allowed based on a set of policies. For example, the command content validator may pass the command to a corresponding software component to which the command is directed. By contrast, at action 305, the command content validator may disallow the requested action based upon the set of policies. For example, the command content validator may simply drop the command. At action 306, the command content validator may implement an exception mechanism in response to determining that the command is not allowed. Examples of exception mechanisms may include reporting to an administrator or developer that a disallowed command was intercepted. Of course, the scope of implementations may be adapted to use any appropriate exception mechanism.

Illustrative embodiments of processing platforms will now be described in greater detail with reference to FIGS. 4 and 5. For instance, FIGS. 4 and 5 illustrate example processing platforms on which any of the processing devices of FIG. 1 may be implemented; also, FIGS. 4 and 5 illustrate example processing platforms on which an application, such as the application associated with application layer 200 of FIG. 2, may be run.

Figure 4:
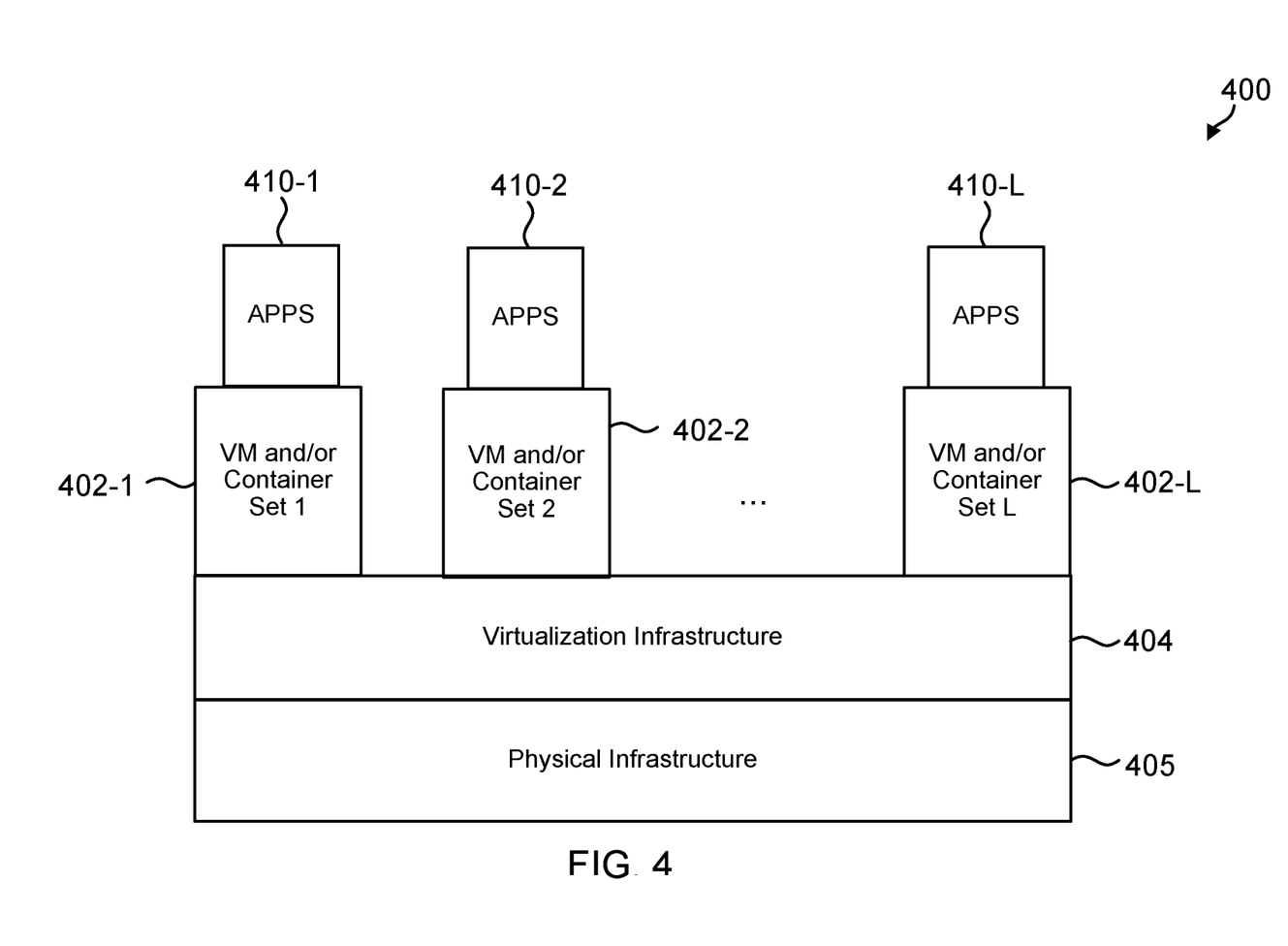
FIG. 4 is an illustration of an example processing platform that may be utilized in some embodiments.
Figure 5:
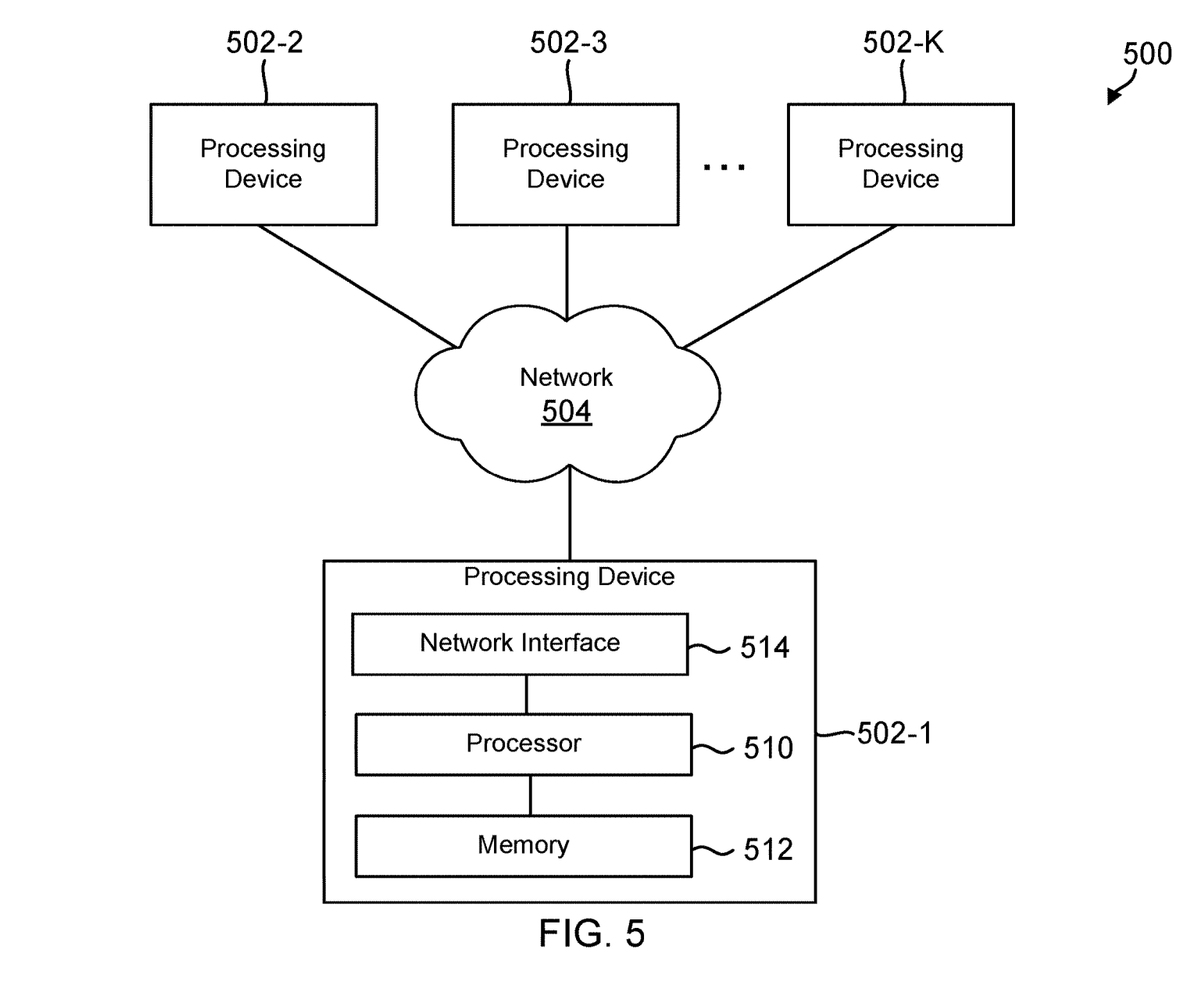
FIG. 5 is an illustration of an example processing platform that may be utilized in some embodiments.

FIG. 4 shows an example processing platform including cloud infrastructure 400. The cloud infrastructure 400 includes a combination of physical and virtual processing resources that are utilized to implement at least a portion of the information processing system 100. The cloud infrastructure 400 may include multiple virtual machines (VMs) and/or container sets 402-1, 402-2, . . . 402-L implemented using virtualization infrastructure 404. The virtualization infrastructure 404 runs on physical infrastructure 405 and may include one or more hypervisors and/or operating system-level virtualization infrastructure. The operating system-level virtualization infrastructure may include kernel control groups of a Linux operating system or other type of operating system.

The cloud infrastructure 400 further may include sets of applications 410-1, 410-2, . . . 410-L running on respective ones of the VMs/container sets 402-1, 402-2, . . . 402-L under the control of the virtualization infrastructure 404. In one example, a given one of the applications 410 may correspond to an application in application layer 200 of FIG. 2, where such application may include components 201-203. However, the scope of embodiments includes an application layer that is in a virtualization infrastructure or otherwise. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that may include at least one hypervisor.

A hypervisor platform may be used to implement a hypervisor within the virtualization infrastructure 404, where the hypervisor platform has an associated virtual infrastructure management system. The underlying physical machines may include one or more distributed processing platforms that include one or more storage systems.

In other implementations of the FIG. 4 embodiment, the VMs/container sets 402 include respective containers implemented using virtualization infrastructure 404 that provides operating system level virtualization functionality, such as support for containers running on bare metal hosts, or containers running on VMs. The containers may be implemented using respective kernel control groups of the operating system.

One or more of the processing modules or other components of an information processing system may each run on a computer, server, storage device or other processing platform element. A given such element is viewed as an example of a computing device. The cloud infrastructure 400 shown in FIG. 4 may represent at least a portion of one processing platform. Another example of such a processing platform is processing platform 500 shown in FIG. 5.

The processing platform 500 in this embodiment may include a portion of the information processing system 100 and includes a plurality of processing devices, denoted 502-1, 502-2, 502-3, . . . 502-K, which communicate with one another over a network 504.

The network 504 may include any type of network, including by way of example a global computer network such as the Internet, a WAN, a LAN, a satellite network, a telephone or cable network, a cellular network, a wireless network such as a Wi-Fi or 5G network, or various portions or combinations of these and other types of networks.

The processing device 502-1 in the processing platform 500 may include a processor 510 coupled to a memory 512. The processor 510 may include a microprocessor, a microcontroller, an application-specific integrated circuit (ASIC), a field-programmable gate array (FPGA) or other type of processing circuitry, as well as portions or combinations of such circuitry elements.

The memory 512 may include random access memory (RAM), read-only memory (ROM) or other types of memory, in any combination. The memory 512 and other memories disclosed herein should be viewed as illustrative examples of processor-readable storage media or computer-readable media storing executable program code (e.g., computer-readable instructions) of one or more software programs.

Articles of manufacture including such processor-readable storage media are considered illustrative embodiments. A given such article of manufacture may include, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products including processor-readable storage media can be used.

Also included in the processing device 502-1 is network interface circuitry 514, which is used to interface the processing device with the network 504 and other system components and may include conventional transceivers.

The other processing devices 502 of the processing platform 500 are assumed to be configured in a manner similar to that shown for processing device 502-1. Each of the processing devices 502 is an example of an information handling system (IHS). Information handling systems may include any of a variety of devices, such as servers, personal computers, smart phones, and the like. Any of the processing devices 502 may be configured to execute computer-readable instructions to perform actions of the application development pipeline and/or actions associated with FIGS. 2-3.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the implementation(s) described herein embrace all such modifications and changes and, accordingly, the above description should be regarded in an illustrative rather than a restrictive sense.

Although the implementation(s) is/are described herein with reference to specific embodiments, various modifications and changes can be made without departing from the scope of the present implementation(s), as set forth in the claims below. Accordingly, the specification and figures are to be regarded in an illustrative rather than a restrictive sense, and all such modifications are intended to be included within the scope of the present implementation(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:
during runtime of an application, intercepting a first application programming interface (API) call directed to a first software component and from a second software component, wherein the application includes the first and second software components in an application layer;
comparing the first API call to a stored set of policies, wherein the set of policies sets out either or both of allowed API call content and disallowed API call content;
determining that the first API call is allowed based on the set of policies; and
allowing a first requested action of the first API call to be performed.

2. The method of claim 1, wherein the set of policies is hardcoded in the application.

3. The method of claim 1, wherein comparing the first API call to the stored set of policies comprises:
comparing a syntax of the first API call to a syntax policy.

4. The method of claim 1, wherein comparing the first API call to the stored set of policies comprises:
comparing semantics of the first API call to a policy that identifies allowed or disallowed semantics.

5. The method of claim 1, further comprising:
intercepting a second API call directed to the first software component;
comparing the second API call to the set of policies;
determining that the second API call is invalid, based on comparing the second API call to the set of policies; and
disallowing a second requested action, which is associated with the second API call.

6. The method of claim 5, wherein disallowing the second requested action comprises:
not passing the second API call to the first software component.

7. The method of claim 1, wherein allowing the first requested action comprises:
passing the first API call to the first software component.

8. The method of claim 1, wherein the method is performed by the second software component.

9. The method of claim 1, wherein the method is performed by a side container that is associated with the first software component.

10. An IHS (Information Handling System) configured to support command content validation in an application layer, the IHS comprising:
one or more processors;
one or more memory devices coupled to the one or more processors, the one or more memory devices storing computer-readable instructions that, upon execution by the one or more processors, cause the IHS to:
receive an application programming interface (API) call directed to a first software component of an application and from a second software component, wherein the application includes the first and second software components in the application layer;
compare the API call to a stored set of policies, wherein the set of policies sets out either or both of allowed API call content and disallowed API call content; and
either allow or disallow a requested action of the API call based on the set of policies.

11. The IHS of claim 10, wherein the computer-readable instructions to cause the IHS to compare the API call to a stored set of policies includes computer-readable instructions to cause the IHS to:
compare a syntax of the API call to a syntax policy.

12. The IHS of claim 10, wherein the computer-readable instructions to cause the IHS to compare the API call to a stored set of policies includes computer-readable instructions to cause the IHS to:
compare semantics of the API call to a semantic policy.

13. A computer-readable storage device having instructions stored thereon for validating commands within an application operating on an IHS (Information Handling System), wherein execution of the instructions by one or more processors of the IHS causes the one or more processors to:
receive a first application programming interface (API) call directed to a first software component and from a second software component, wherein the application includes the first and second software components in an application layer;
compare the first API call to a stored set of policies, wherein the set of policies sets out either or both of allowed API call content and disallowed API call content;
determine that the first API call is disallowed based on the set of policies; and
disallow a requested action of the first API call to be performed.

14. The computer-readable storage device of claim 13, wherein the first API call is included within a set of APIs, and wherein the stored set of policies specifically excludes an API associated with the first API call.

15. The computer-readable storage device of claim 14, wherein the instructions to cause the one or more processors to disallow the first requested action comprises instructions to cause the one or more processors to:
drop the first API call.

16. The computer-readable storage device of claim 14, further comprising instructions to cause the one or more processors to:
determine that a second and subsequent API call is allowed based on the set of policies.

17. The method of claim 1, wherein the first API call specifies an endpoint, which corresponds to a resource within the application.

18. The method of claim 1, wherein the first API call specifies an endpoint comprising a text string, further wherein determining that the first API call is allowed includes determining that the text string is allowed.

19. The method of claim 18, wherein the text string comprises a uniform resource locator (URL).

20. The IHS of claim 10, wherein the first API call specifies an endpoint, which corresponds to a resource within the application.

\* \* \* \* \*